United States Patent [19]

Stenstrom

[11] 4,410,885
[45] Oct. 18, 1983

[54] CONDUCTIVE FLUID DETECTING METHOD AND APPARATUS

[76] Inventor: Stephen.M. Stenstrom, P.O. Box 3531, Cambridge, Ontario, Canada

[21] Appl. No.: 345,245

[22] Filed: Feb. 3, 1982

[30] Foreign Application Priority Data

Dec. 23, 1981 [CA] Canada .................................. 393,061

[51] Int. Cl.³ ............................................. G08B 21/00
[52] U.S. Cl. .............................. 340/604; 123/196 S; 123/198 D; 324/65 P; 340/59; 340/620
[58] Field of Search ............... 340/602, 603, 604, 605, 340/620, 59; 200/61.04, 61.05; 73/61.1 R; 324/65 P; 123/196 S, 198 D

[56] References Cited

U.S. PATENT DOCUMENTS

| | | | |
|---|---|---|---|
| 2,229,036 | 1/1941 | Bird et al. | 340/605 X |
| 2,420,177 | 5/1947 | Krall | 340/631 X |
| 2,716,165 | 8/1955 | Pfitzner | 340/631 X |
| 3,582,612 | 6/1971 | Siemianowski | 200/61.04 X |
| 4,304,132 | 12/1981 | Snaper | 340/620 X |

*Primary Examiner*—John W. Caldwell, Sr.
*Assistant Examiner*—Daniel Myer
*Attorney, Agent, or Firm*—Riches, McKenzie & Herbert

[57] ABSTRACT

This invention relates to a method of detecting the presence of a conductive fluid such as water in a chamber such as the oil pan of an internal combustion engine and apparatus for carrying out the method. A resilient flexible sensor probe is mounted in the oil drain and electrically connected to an alarm which is activated by current flow. The sensor probe has an outer electrode member with a portion formed of a helical coil through which an insulated wire runs to form an inner electrode member. The inner electrode member is connected to the alarm, while the outer electrode member is grounded to the engine. The sensor probe bends to a position where its inner end portion depends into contact with the bottom of the oil pan. The inner electrode member ends at a bare tip which is surrounded by an insulative sleeve which prevents direct contact with the bottom of the oil pan. The outer electrode member ends at a bare wire portion which is spaced a short distance from the tip of the inner electrode member. When the tip of the inner electrode member is covered by water, the circuit is completed either through the outer electrode or directly to the oil pan, and the warning alarm is activated. This dependent resilient flexible sensor probe structure has the advantage that the build up of insulative sludge is avoided by the constant motion of the inner end portion due to flexing of the sensor probe as a result of engine motion, as well as by relative longitudinal motion between the inner ends of the electrode members. Another advantage is that the inner end portion of the sensor probe contacts the bottom of the oil pan at its lowest point.

12 Claims, 2 Drawing Figures

CONDUCTIVE FLUID DETECTING METHOD AND APPARATUS

BACKGROUND OF THE INVENTION

This invention relates to a method of detecting the presence of a conductive fluid in a chamber and apparatus for carrying out the method. One application of the invention is to provide a warning of the presence of water or other conductive coolant fluid in the oil in the oil pan of an internal combustion engine.

In the past, a variety of methods and apparatus which detect changes in conductivity have been used for this purpose. However, in addition to having other disadvantages, they have been found to be unacceptably susceptible to malfunction as a result of the build up of sludge over a prolonged period of time. This sludge which forms from contaminants in the lubricating oil has an insulative effect which may prevent the flow of current, despite the presence of conductive coolant fluid. U.S. Pat. No. 2,716,165 to Pfitzner which issued Aug. 23, 1955 shows a structure with a sensor probe received in a special housing in the oil pan or crank case of the engine. In addition to the insulative sludge from the lubricating oil which builds up on the electrodes over a period of time, this structure has the disadvantage that is prohibitively expensive to install, particularly on existing engines. U.S. Pat. No. 4,030,028 to Allender which issued June 14, 1977 shows a sensor which is mounted in place of the oil drain plug, but this structure has the disadvantage that the sensor is not located right at the bottom of the oil pan, as well as also being susceptible to the build up of insulative sludge which settles out of the oil onto the sensor. U.S. Pat. No. 3,793,586 to Heeps which issued Feb. 19, 1974 relates to a water detector for aircraft fuel tanks which utilizes a depending electrode structure. However, this structure is not satisfactory for use in an oil pan because of the problem of the build up of insulative sludge from the oil.

SUMMARY OF THE INVENTION

Accordingly, it is an object of the present invention to at least partially overcome these disadvantages by providing an improved method and apparatus which utilizes the conductivity of the fluid to detect its presence in the fluid, while reducing the effect of any insulative sludge from the fluid.

To this end, in one of its aspects, the invention provides apparatus for detecting the presence of a conductive fluid at the bottom of a chamber, comprising:

(a) an elongated flexible sensor probe adapted to project through an opening into the chamber, the flexible sensor probe having an outer end portion at the opening and an inner end portion which depends against the bottom of the chamber, the sensor probe having a first conductive electrode member extending from an outer end at the opening to an inner end and insulative means preventing contact between the first electrode member and the bottom of the chamber;

(b) means to continuously monitor for the presence of the conductive fluid in the chamber; and (c) connector means to electrically connect the monitor means to the first electrode member of the sensor probe and to a power source, whereby the presence of the conductive fluid at the inner end of the first electrode member activates the monitor means.

In another of its aspects, the invention further provides apparatus for detecting the presence of a heavier conductive coolant fluid at the bottom of an oil pan containing lighter lubricating oil in an internal combustion engine, comprising:

(a) an elongated flexible sensor probe having an outer end portion and an inner end portion, the outer end portion securely sealedly received in an oil drain opening in the bottom of the oil pan with the sensor probe projecting into the oil pan where it resiliently flexes sufficiently under gravitational forces to permit the inner end portion to depend against the bottom of the oil pan and move with an irregular motion as a result of movement of the oil pan, the sensor probe having a first conductive electrode member extending from an outer end at the drain opening to an inner end adjacent the inner end of the sensor probe, a second conductive electrode member extending from an outer end at the drain opening which is grounded to the oil pan to an inner end adjacent the inner end of the sensor probe, and insulative means preventing contact between the first and second electrode members and between the first electrode member and the oil pan;

(b) alarm means mounted remotely from the sensor probe; and;

(c) conductor means to electrically connect the alarm means to the first electrode member of the sensor probe and to a power source, whereby the alarm means is activated by a current through a circuit from the power source to the oil pan which is completed by the presence of the conductive coolant fluid at the inner end portion of the sensor probe.

In a further of its aspects, the invention still further provides a method of detecting the presence of a conductive coolant fluid at the bottom of an oil pan in an internal combustion engine comprising the steps of:

(a) inserting an elongated flexible sensor probe having an outer end portion and an inner end portion through an oil drain opening in the bottom of the oil pan and securing it in a position wherein the outer end portion is sealingly received in the oil drain opening with the sensor probe projecting generally upward into the oil pan where it resiliently flexes sufficiently for the inner end portion to depend against the bottom of the oil pan and move an irregular motion as a result of movement of the oil pan, the sensor probe having a first conductive electrode member extending from an outer end at the drain opening to an inner end, a second conductive electrode member extending from an outer end grounded to the oil pan to an inner end, and insulative means preventing contact between the first and second electrode members and between the first electrode member and the oil pan;

(b) mounting an alarm means at a convenient location to provide a continuous monitor for the presence of the coolant fluid;

(c) electrically connecting the alarm means to a power source and to the first electrode member of the sensor probe; and (d) activating the alarm means by a current flowing through a circuit from the power source to the oil pan completed by the presence of the conductive coolant fluid at the inner end portion of the sensor probe.

Further objects and advantages of the invention will appear from the following description taken together with the accompanying drawings.

DESCRIPTION OF THE PREFERRED EMBODIMENT

Figure 1:
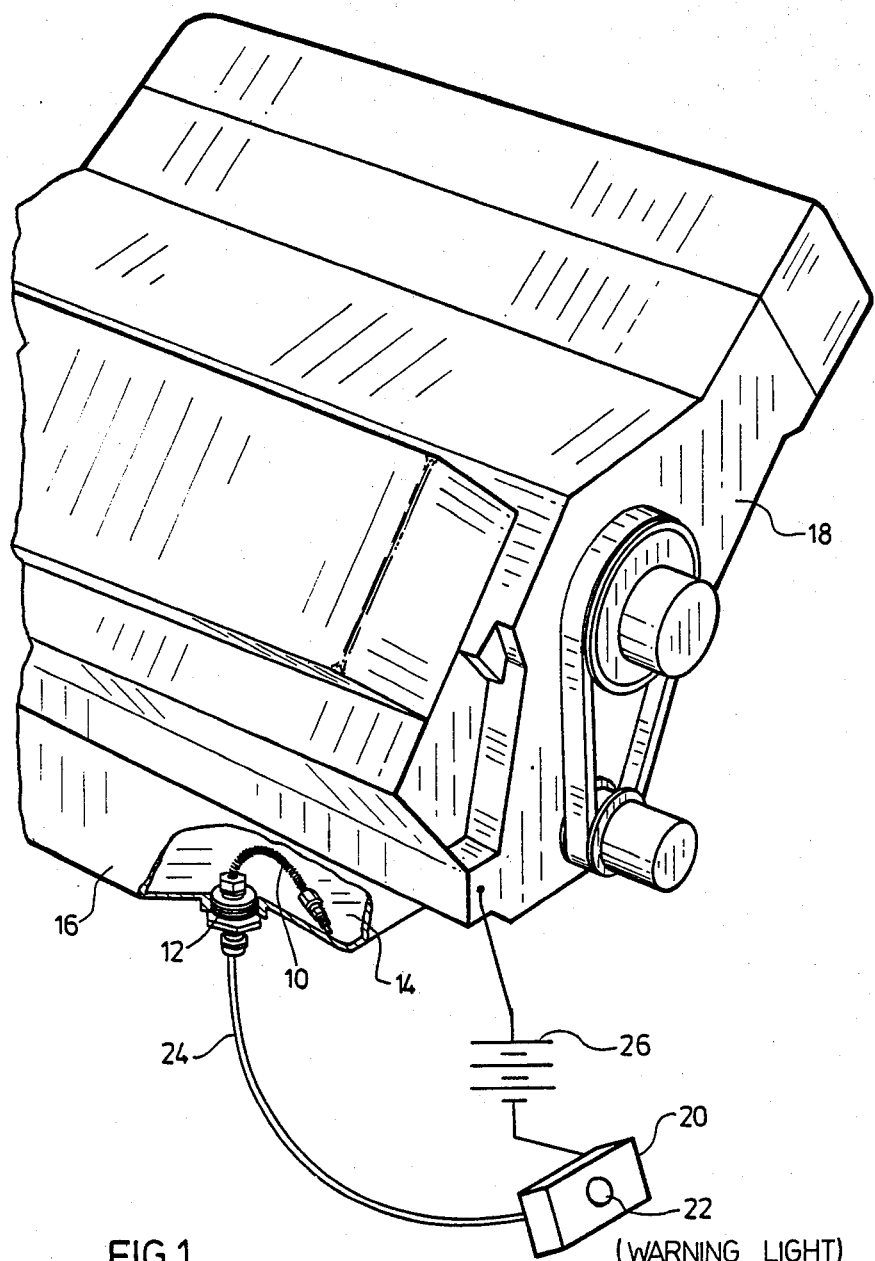
FIG. 1 is a view of detecting apparatus according to a preferred embodiment of the invention.

Reference is first made to FIG. 1 which shows detecting apparatus having a sensor probe 10 mounted in the oil drain opening 12 in the bottom 14 of the oil pan 16 of an internal combustion engine 18. A monitor 20 is mounted in a convenient location and includes a ground sensitive conductance meter connected to a suitable alarm such as a warning light 22. The monitor 20 is electrically connected to the sensor probe 10 by wire 24 and is also connected to a battery 26 or other suitable power source shown diagramatically in FIG. 1. The apparatus may be quickly and conveniently mounted on an existing engine by removing the oil drain plug, screwing the sensor probe 10 in its place, mounting the monitor 20 in a convenient location, and wiring them up.

Figure 2:
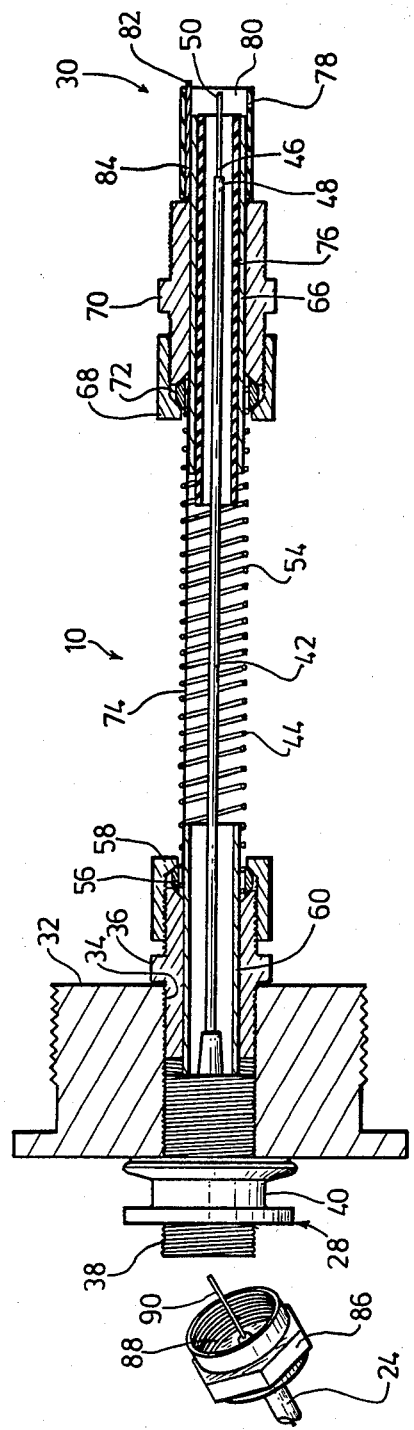
FIG. 2 is a longitudinal sectional view of the sensor probe of the apparatus seen in FIG. 1.

Referring to FIG. 2, the sensor probe 10 will now be described in more detail. The sensor probe 10 extends from an outer end portion 28 which is received in the oil drain opening and, although shown straight for convenience in FIG. 2, is sufficiently flexible that it bends under the force of gravity until the downwardly depending inner end portion 30 contacts the bottom 14 of the oil pan 16. While the sensor probe 10 is quite flexible, it is also sufficiently resilient that, as further discussed below, the inner end portion will move with an irregular motion relative to the bottom of the oil pan as a result of the sensor probe 10 flexing due to engine motion or vibration. The outer end portion 28 has a threaded bushing 32 with a central opening 34 therethrough. The central opening 34 is threaded to receive a male pipe connector 36 in its inner end and an insulated male wiring connector 38 with a rubber bushing 40 in its outer end.

The sensor probe 10 has an inner electrode member 42 and an outer electrode member 44. The inner electrode member 42 is provided by a conductive wire 46 covered by insulation 48 with a bare corrosion resistant tip 50 at its inner end 52. The outer electrode member 44 has a resilient flexible portion provided by a helical coil 54 which is connected by compression sleeve 56, nut 58 and male connector 36 to elongated sleeve 60. As may be seen, the elongated sleeve extends through the central opening 34 in the bushing 32 into the wiring connector 38 to provide the outer end of the outer electrode member 42 when the nut 58 is tightened onto the male connector 36 which in turn has been screwed into the bushing 32 to provide an integral connection. The insulated wire 46 forming the inner electrode member 42 extends inside the helical coil 54 and through the elongated sleeve 60 to its outer end where it joins the connecting wire 24 in insulated wiring connector 38. Thus, the outer electrode member 44 is electrically connected to the bushing 32 to ground it to the engine oil pan 16, whereas the outer end of the inner electrode member 42 is electrically connected to the wire 24 while being insulated from the outer electrode member 44. Furthermore, when the threaded bushing 32 is tightened in the oil drain opening 12, this structure provides a plug which holds the sensor probe securely in place, but does not allow any leakage of oil from the oil pan 16.

Another elongated sleeve 66 is attached to the outer end of the helical coil 54 by screwing nut 68 onto male connector 70 over compression sleeve 72. A thin steel wire 74 also extends inside the helical coil 54 and is secured at each end between the compression sleeves 56,72 and the respective male connectors 36,70. This avoids permanent damage to the sensor probe 10 as a result of undue stretching of the helical coil 54 during installation or otherwise. Elongated sleeve 66 has another sleeve 76 formed of tetrafluoroethylene or a similar insulative frictionally retained inside it through which the inner electrode member extends with its bare tip 50 normally extending slightly beyond the end of the tetrafluoroethylene sleeve 76. Another insulative sleeve 78 is located over a portion of the elongated sleeve 66 and projects beyond the end of it to form a recess 80 into which the tip 50 of the inner electrode member 42 normally projects. The outer electrode member 44 terminates at its inner end 82 which is provided by a short bare wire portion 84 which is attached to extend between the elongated sleeve 66 and the outer insulative sleeve 78 to project slightly beyond the outer sleeve 78. Thus, the inner end 52 of inner electrode member 42 provided by bare tip 50 is spaced only a short distance from the inner end 82 of outer electrode member 44 provided by bare wire portion 84. In this embodiment, the helical coil 54 is formed of spring steel, the fittings are formed of brass, and the tip 50 of the inner electrode member is formed of a corrosion resistant metal such as an alloy of palladium.

The wire 24 which connects the sensor probe 10 to the monitor 20 is a standard single conductor insulated wire with a threaded fitting 86 which screws onto the insulated wiring connector 38 so that the conductor 90 is received in an insulated aperture in the connector 38 to make electrical contact with the inner electrode member 42. The fitting 86 has a neoprene O-ring 88 which contacts the end of the wiring connector 38 to provide a moisture proof seal, and outer rubber bushing 40 provides a further seal as well as protects the connector. The monitor 20 includes a conventional ground sensitive conductance meter wired to a light 22 or other warning means which is activated when a current flows through the circuit and needs not be described further.

In use in a conventional truck engine, the oil drain plug is removed and replaced by the sensor probe 10 which is screwed securely into place in the oil drain opening 12. The monitor 20 is mounted in a convenient location on the cab of the truck and is connected to a source of DC power from the battery. The sensor probe is electrically connected to the monitor 20 by wire 24 which runs between them. As seen in FIG. 1, when the sensor probe 10 is installed in this position, it bends to a position wherein the inner end portion 30 depends into contact with the bottom 14 of the oil pan 16. However, in addition to being sufficiently flexible for the sensor probe 10 to assume this position, the helical coil 54 is also sufficiently resilient that the inner end portion 30 is free to move in this position. Thus, when the oil pan 16 moves due to movement of the vehicle or engine vibration, the sensor probe 10 flexes, resulting in continuous irregular motion of the inner end portion 30 along the bottom of the oil pan 16. This motion of the inner end portion 30 of the sensor probe 10 provides the advantage that it avoids or reduces the build up of insulative sludge from contaminants in the oil on the end portion of the sensor probe 10 and on that area of the bottom of the oil pan. In addition, the flexible resilient helical coil 54 is formed with an internal diameter which is sufficiently larger than the outside diameter of the insulated wire 46 running through it that this flexing motion of the sensor probe 10 results in constant relative longitudinal motion between the inner ends of the inner and outer electrode members. This occurs, of course, because of the constant changes in compression of the helical coil 54 and the location of the insulated wire 46 in it. The relative motion between the inner ends 52,82 of the electrode members also helps to keep them clear of insulative sludge which might otherwise prevent the flow of current between them. Furthermore, this flexible dependent structure of the sensor probe 10 ensures that its inner end portion 30 contacts the bottom 14 of the oil pan 16 at its low point, and even makes some provision for the engine being located on a slope by the fact that the sensor probe 10 will rotate around its outer end under its own weight.

During operation with the sensor probe 10 connected to the power supply through the monitor 20, there is no current flow in the circuit when there is no water or other conductive coolant fluid in the oil pan. The wire portion 84 which forms the inner end 82 of the outer electrode member 44 which is grounded to the oil pan 16, is separated by a short distance from the tip 50 of the inner electrode member 42. Likewise, contact between the conductive bottom 14 of the oil pan and the tip 50 of the inner electrode member 42 is prevented by the outer insulative sleeve 78 which projects around it. However, when a quantity of water enters the oil pan 16 due, say to a crack in the engine block, it settles on the bottom as it is heavier than the lubricating oil. As soon as it covers the tip 50 of the inner electrode member 42, a current flows from the inner electrode member 42 through the water either directly to the oil pan 16 or through the outer electrode member 44 to the oil pan. The current flow in the circuit immediately activates the alarm light 22 which warns the driver to shut down the engine or take other remedial action.

In some applications, the oil drain opening 12 is on an angle or on the side of the oil pan 16, in which case the sensor probe 10 arches out from the side of the oil pan with the inner end portion 30 depending against the bottom 14 of the oil pan. In this position, the tip 50 of inner electrode 42 projects a little further outward due to the sensor probe being less bent, which compensates to some extent for the lesser angle of incidence of the inner end portion 30 with the floor of the oil pan.

Although the description of the invention has been given with respect to a particular embodiment, it is not to be construed in a limiting sense. Many variations and modifications will now occur to those skilled in the art. In particular, it is apparent that for certain applications, the monitor 20 need not be located remote from the sensor probe 10. Furthermore, the monitor 20 may include an indicator or recorder or another type of alarm such as a horn. For some applications where the formation of insulative sludge is not a severe problem and there is not insulative paint or other coating on the bottom of the oil pan, it is possible to use an embodiment of the invention with only a single electrode member, relying on conductance through the water directly to the oil pan for ground. Applications other than in oil pans will be apparent. For instance, this invention could be utilized to detect the presence of conductive fluids in fuel tanks. For a definition of the invention, reference is made to the appended claims.

What I claim is:

1. Apparatus for detecting the presence of a conductive fluid at the bottom of a chamber, comprising:
   (a) an elongated flexible sensor probe adapted to project through an opening into the chamber, the flexible sensor probe having an outer end portion securely received in the opening and an inner end portion, the sensor probe being sufficiently resiliently flexible that the inner end portion depends against the bottom of the chamber and moves with an irregular motion relative to the bottom of the chamber as a result of movement of the chamber, the sensor probe having a first conductive electrode member extending from an outer end at the opening to an inner end and insulative means preventing contact between the first electrode member and the bottom of the chamber;
   (b) monitor means to indicate the presence of the conductive fluid in the chamber; and
   (c) connector means to electrically connect the monitor means to the first electrode member of the sensor probe and to a power source, whereby the presence of the condutive fluid at the inner end of the first electrode member activates the monitor means.

2. Apparatus as claimed in claim 1 wherein the outer end of the sensor probe is adapted to be sealed in an oil drain opening in an oil pan of an internal combustion engine, in which position the sensor probe bends from the outer end portion which projects upwardly into the oil pan to the inner end portion which depends against the bottom of the oil pan.

3. Apparatus as claimed in claim 2 wherein the monitor means is an alarm which is activated by a current through a circuit from the power source to the bottom of the oil pan which is completed by the presence of the conductive fluid at the inner end of the first electrode member.

4. Apparatus for detecting the presence of a heavier conductive coolant fluid at the bottom of an oil pan containing lighter lubricating oil in an internal combustion engine, comprising:
   (a) an elongated flexible sensor probe having an outer end portion and an inner end portion, the outer end portion securely sealedly received in an oil drain opening in the bottom of the oil pan with the sensor probe projecting into the oil pan where it resiliently flexes sufficiently under gravitational forces to permit the inner end portion to depend against the bottom of the oil pan and move with an irregular motion as a result of movement of the oil pan, the sensor probe having a first conductive electrode member extending from an outer end at the drain opening to an inner end adjacent the inner end of the sensor probe, a second conductive electrode member extending from an outer end at the drain opening which is grounded to the oil pan to an inner end adjacent the inner end of the sensor probe, and insulative means preventing contact between the first and second electrode members and between the first electrode member and the oil pan;
   (b) alarm means mounted remotely from the sensor probe; and
   (c) conductor means to electrically connect the alarm means to the first electrode member of the sensor probe and to a power source, whereby the alarm means is activated by a current through a circuit from the power source to the oil pan which is completed by the presence of the conductive coolant fluid at the inner end portion of the sensor probe.

5. Apparatus as claimed in claim 4 wherein the second electrode member includes a resilient flexible elongated helical portion and the first electrode member comprises a flexible inslulated wire which extends inside the helical portion of the second electrode member, whereby the irregular motion of the inner end portion of the sensor probe results in relative longitudinal motion between the inner ends of the first and second electrode members.

6. Apparatus as claimed in claim 5 wherein the inner end of the second electrode member comprises a hollow sleeve portion, the inner end of the first electrode member comprises a bare corrosion resistant tip which extends through the sleeve portion of the second electrode member, and the insulative means includes a first hollow insulative sleeve extending between the collar portion of the second electrode and the tip of the first electrode.

7. Apparatus as claimed in claim 6 wherein the tip of the first electrode member extends slightly beyond the sleeve portion of the second electrode member, and the insulative means further includes a second hollow insulative sleeve projecting over the sleeve portion of the second electrode to form a recess into which the tip of the first electrode member extends in an operative position.

8. Apparatus as claimed in claim 7 wherein the inner end of the second electrode member has a wire portion extending between the sleeve portion and the second insulative sleeve to project slightly beyond the second insulative sleeve.

9. Apparatus as claimed in claim 8 wherein the tip of the first electrode member is formed of a palladium alloy.

10. Apparatus as claimed in claim 5 wherein the sensor probe further includes a flexible length limiting means extending inside the helical portion of the second electrode to limit the longitudinal extension of the helical portion to a predetermined amount.

11. A method of detecting the presence of a conductive coolant fluid at the bottom of an oil pan in an internal combustion engine comprising the steps of:
 (a) inserting an elongated flexible sensor probe having an outer end portion and an inner end portion through an oil drain opening in the bottom of the oil pan and securing it in a position wherein the outer end portion is sealingly received in the oil drain opening with the sensor probe projecting generally upward into the oil pan whereby it resiliently flexes sufficiently for the inner end portion to depend against the bottom of the oil pan and move with an irregular motion as a result of movement of the oil pan, the sensor probe having a first conductive electrode member extending from an outer end at the drain opening to an inner end, a second conductive electrode member extending from an outer end grounded to the oil pan to an inner end, and insulative means preventing contact between the first and second electrode members and between the first electrode member and the oil pan;
 (b) mounting an alarm means at a convenient location to provide a continuous monitor for the presence of the coolant fluid;
 (c) electrically connecting the alarm means to a power source and to the first electrode member of the sensor probe; and
 (d) activating the alarm means by a current flowing through a circuit from the power source to the oil pan completed by the presence of the conductive coolant fluid at the inner end portion of the sensor probe.

12. A method as claimed in claim 11 wherein the second electrode member has a flexible elongated portion and the first electrode member has a flexible insulated wire portion which extends inside the helical portion of the second electrode member, the internal diameter of the helical portion being sufficiently larger than the external diameter of the insulated wire portion and the resiliency and flexibility of the helical portion and the insulated portion being sufficiently different that the irregular motion of the inner end portion of the sensor probe results in relative longitudinal motion between the inner ends of the first and second electrode members which reduces the build up of contaminants around them.

* * * * *